(12) United States Patent
December

(10) Patent No.: US 7,913,448 B2
(45) Date of Patent: Mar. 29, 2011

(54) TRAPS FOR CRABS OR LOBSTERS

(76) Inventor: John December, Surrey (CA)

( * ) Notice: Subject to any disclaimer, the term of this patent is extended or adjusted under 35 U.S.C. 154(b) by 49 days.

(21) Appl. No.: 11/656,978

(22) Filed: Jan. 24, 2007

(65) Prior Publication Data

US 2007/0261292 A1 Nov. 15, 2007

(30) Foreign Application Priority Data

Feb. 20, 2006 (CA) .................................. 2536970

(51) Int. Cl.
*A01K 69/06* (2006.01)
*A01K 69/08* (2006.01)
(52) U.S. Cl. ............................................ 43/100; 43/102
(58) Field of Classification Search .................... 43/100, 43/101–106
See application file for complete search history.

(56) References Cited

U.S. PATENT DOCUMENTS

| | | | | |
|---|---|---|---|---|
| 2,119,828 | A * | 6/1938 | Nordenstam | 43/100 |
| 2,530,449 | A | 11/1950 | Bush | |
| 2,760,297 | A * | 8/1956 | Buyken | 43/105 |
| 3,440,758 | A * | 4/1969 | Prince | 43/100 |
| 3,678,612 | A * | 7/1972 | Hendrickson | 43/66 |
| 3,795,073 | A * | 3/1974 | Olsen | 43/105 |
| 4,184,283 | A * | 1/1980 | Wyman | 43/102 |
| 4,819,369 | A * | 4/1989 | Bodker | 43/102 |
| 5,088,230 | A * | 2/1992 | Moritz | 43/100 |
| 5,199,211 | A * | 4/1993 | McKenzie | 43/105 |
| 5,259,809 | A * | 11/1993 | Rainey, Jr. | 452/1 |
| 5,351,435 | A * | 10/1994 | Hill | 43/100 |
| 5,478,273 | A * | 12/1995 | Ives | 452/1 |
| 5,771,627 | A * | 6/1998 | Mattson et al. | 43/100 |
| 5,924,237 | A * | 7/1999 | Ives | 43/100 |
| 5,943,812 | A * | 8/1999 | Pizzolato | 43/58 |
| 5,946,850 | A * | 9/1999 | Sarkisyan | 43/100 |
| 5,974,725 | A * | 11/1999 | Knight | 43/100 |
| 6,035,575 | A * | 3/2000 | Hilty | 43/100 |

* cited by examiner

*Primary Examiner* — David J Parsley
(74) *Attorney, Agent, or Firm* — Eric J. Weierstall, Esq.; Tangent Law Group, PLLC

(57) ABSTRACT

A trap for crabs or lobsters has a mesh extending over a trap frame, with at least one inlet opening provided with a one-way inlet gate spaced apart pins which are pivotable between open and closed positions. Pin retainers prevent spreading of the pins apart from one another when the pins are in the closed position and an undersized crab outlet opening, dimensioned to allow undersized crab or lobsters to escape from the interior chamber, is provided at a side of the trap and at the bottom of the trap. The frame includes an top peripheral frame portion and finger grip openings at the underside of the trap frame. The one-way inlet gate has first and second sets of spaced apart pins, each set being pivotable independently of the other between open and closed positions. Also, the one-way inlet gate has pairs of pins which are pivotable between the open and closed positions, each pair being formed by parallel legs of a U-shaped length of wire, with retainers engaging the legs of each pair to prevent spreading of the legs.

3 Claims, 5 Drawing Sheets

TRAPS FOR CRABS OR LOBSTERS

BACKGROUND OF THE INVENTION

1. Field of the Invention

The present invention relates to traps for crabs or lobsters and comprising a mesh of rope or other material provided on a trap frame.

2. Description of the Related Art

Crab traps in use at the present time have hollow interiors within crab trap frames, with wire meshes extending around the frame to enclose a hollow interior and with crab inlet openings in the meshes and the frames, through which crabs can crawl into the interiors of the crab frames when the crab traps are in use.

In order to prevent the crabs from leaving the interiors of the crab traps, the crab inlet openings have been shaped as conical openings spaced upwardly from the bottoms of the traps and tapering inwardly of the traps so as to make it difficult for the crabs to find their way out from the traps. Also, the crab inlet openings have been provided with one-way gates, which open inwardly to allow the crabs to enter. These one-way gates have been made of pivotably mounted pins.

However, in practice an undesirably large number of crabs, having entered the traps, are able to escape through the crab inlet openings, thereby substantially reducing the crabbers catch. The crabs escape through the one-way gates by spreading apart the pins so as to enable the crabs to squeeze between the pins.

Another problem of conventional crab traps is that they catch and retain undersized crabs, which should preferably be allowed to escape from the traps.

Also, crab traps presently in use are difficult to lift be hand, because the crabbers fingers are unable to effectively penetrate the mesh so as to engage the crab trap frames.

BRIEF SUMMARY OF THE INVENTION

It is accordingly an object of the present invention to provide a novel and improved trap for crabs or lobsters which at least partly mitigates at least one of these problems.

According to the present invention, there is provided a trap comprising a trap frame; a mesh extending over the trap frame; at least one inlet opening; a one-way inlet gate at the opening, the one-way inlet gate comprising a plurality of spaced apart pins which are pivotable between open and closed positions; and pin retainers preventing spreading of the pins apart from one another when the pins are in the closed position.

The provision of the pin retainers prevents the pins from being spread apart from one another by crabs or lobsters attempting to escape from the trap and thereby prevents the crabs or lobsters from being able to move outwardly through the inlet opening.

In a preferred embodiment of the present invention, the pin retainer is in the form of a rake-like pin retainer structure which is formed with open ended slots for receiving the lower ends of the pins as the pins move to their closed positions.

Also according to the present invention, there is provided a trap, comprising a trap frame; a mesh extending over the trap frame; a first inlet opening; a one-way inlet gate at the first inlet opening; and an undersized crab or lobster outlet opening dimensioned to allow undersized crabs or lobsters to escape from the interior chamber.

Preferably, the undersized crab or lobster outlet opening is formed at the bottom of a side of the trap as an horizontally elongate opening between a bottom portion of the frame and a further portion of the frame overlying the bottom portion.

The present invention also provides a trap, comprising a trap frame; a mesh extending over the trap frame; a first inlet opening and a one-way inlet gate at the first inlet opening, the frame including an top frame portion and the mesh providing finger grip openings at the top frame portion.

These finger openings facilitate grasping and lifting of the trap by the user of the trap.

In order to further resist escape of trapped crabs or lobsters from the interior of the trap, there is also provided, according to a further aspect of the present invention, a trap comprising a trap frame; a mesh extending over the trap frame; at least one inlet opening; and a one-way inlet gate at the opening; the one-way inlet gate comprising first and second sets of spaced apart pins; and each of the first and second sets being pivotable independently of the other between open and closed positions.

BRIEF DESCRIPTION OF THE DRAWINGS

The invention will be more readily understood from the following description of an embodiment thereof given, by way of example only, with reference to the accompanying drawings, in which.

DESCRIPTION OF THE PREFERRED EMBODIMENT

Figure 1:
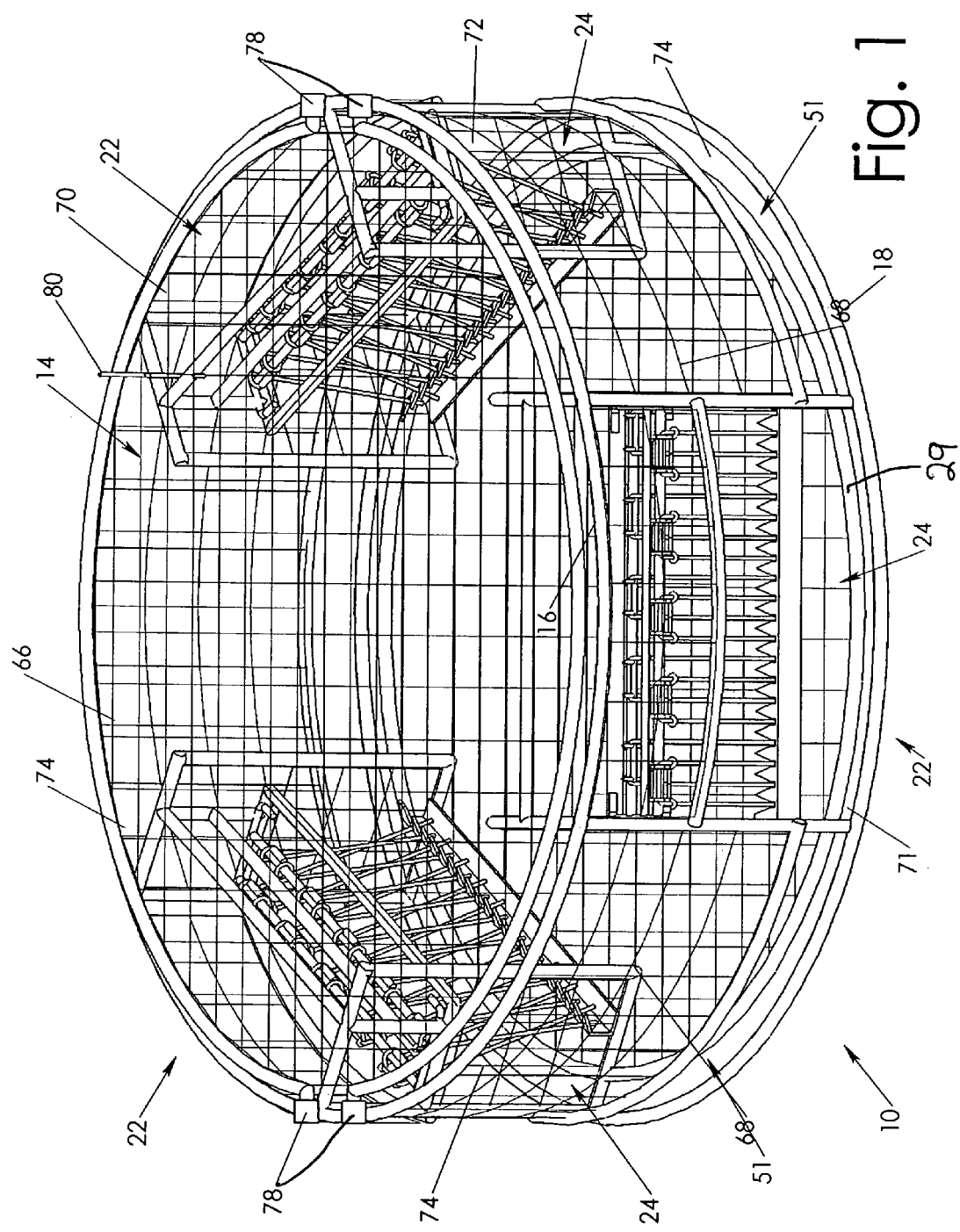
FIG. 1 show a view in perspective of a crab trap embodying the present invention.

In FIG. 1 of the accompanying drawings, there is shown a crab trap, indicated generally by reference numeral 10, according to a preferred embodiment of the present invention. The crab trap 10 has a crab trap frame which is indicated generally be reference numeral 12 in FIG. 2 and which, as shown in FIG. 1, is almost entirely covered by a mesh indicated generally by reference numeral 14. The crab trap frame 12 is made of steel rod and the mesh 14 is made of galvanized wire or twine. The mesh 14 has been omitted from FIG. 2 to facilitate illustration of the crab trap frame 12.

Figure 2:
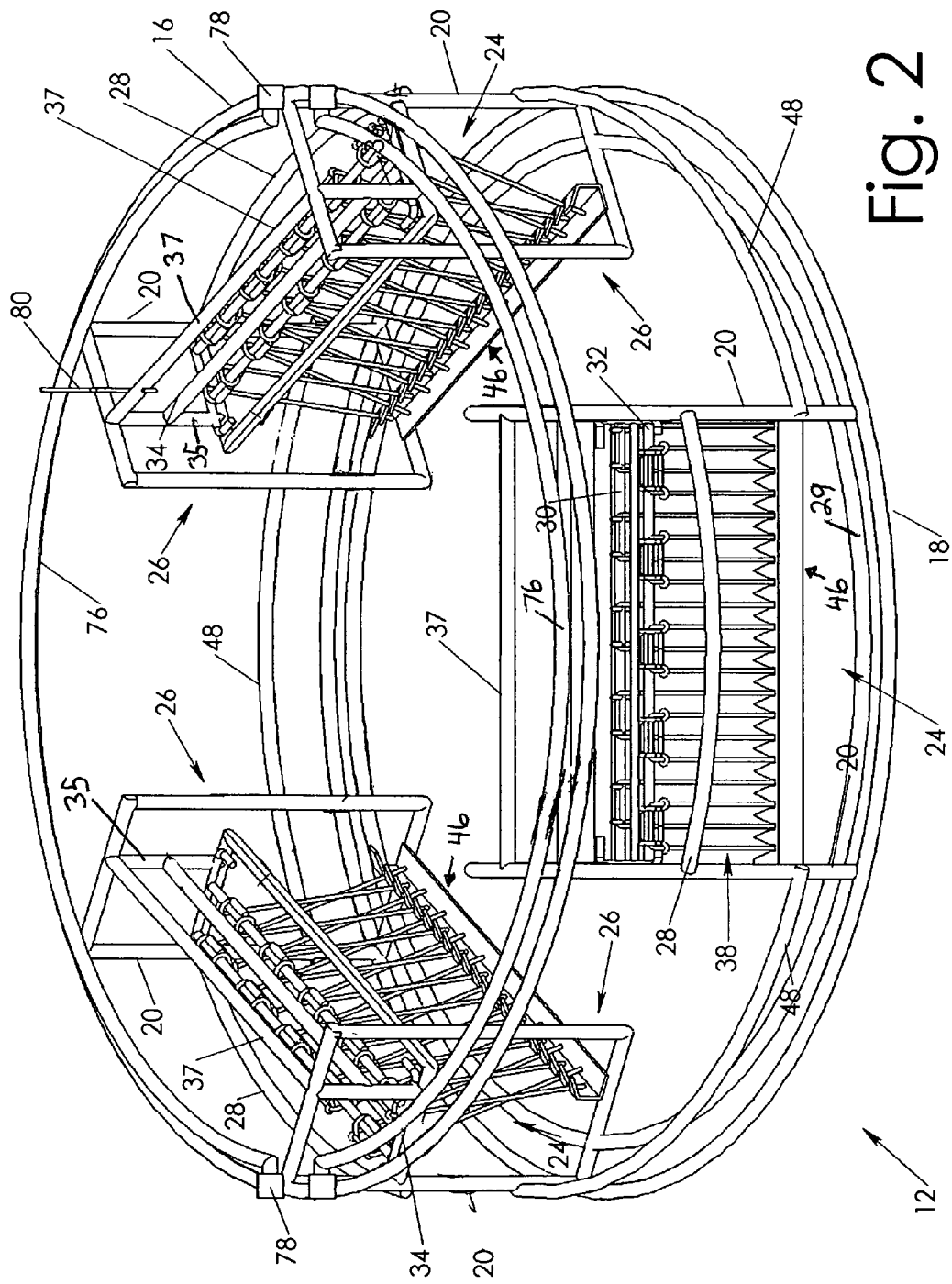
FIG. 2 show a view corresponding to that of FIG. 1, but with a mesh removes from the crab trap to facilitate the illustration of the crab trap.

As can be seen from FIGS. 1 and 2, the crab trap 10 is of circular shape, when viewed from above, and the crab trap frame 12 has circular top and bottom peripheral frame portions 16 and 18, which are interconnected by vertical frame members 20.

The crab trap 10 has three horizontally elongate rectangular crab inlet openings indicated generally by reference numerals 22, which are each provided with a one-way inlet gate indicated generally by reference numeral 24. Each of the inlet gates 24 is mounted between a pair of rectangular frames indicated generally by reference numerals 26, which project inwardly from the top and bottom peripheral frame portions. The vertical frame members 20 form outer sides of the rectangular frames 26, and a circularly curved reinforcement bar 28 extends over each crab inlet opening between the vertical frame members 20. A circular bottom portion 29, which is spaced radially inwardly from the bottom peripheral frame portion 18 so as to provide at the bottom of the crab trqp 12 a gap 71 into which the fingers of crabber can be inserted to facilitate handling of the crab trap 12, is connected to the bottoms of the rectangular frqmes 26.

Figure 4:
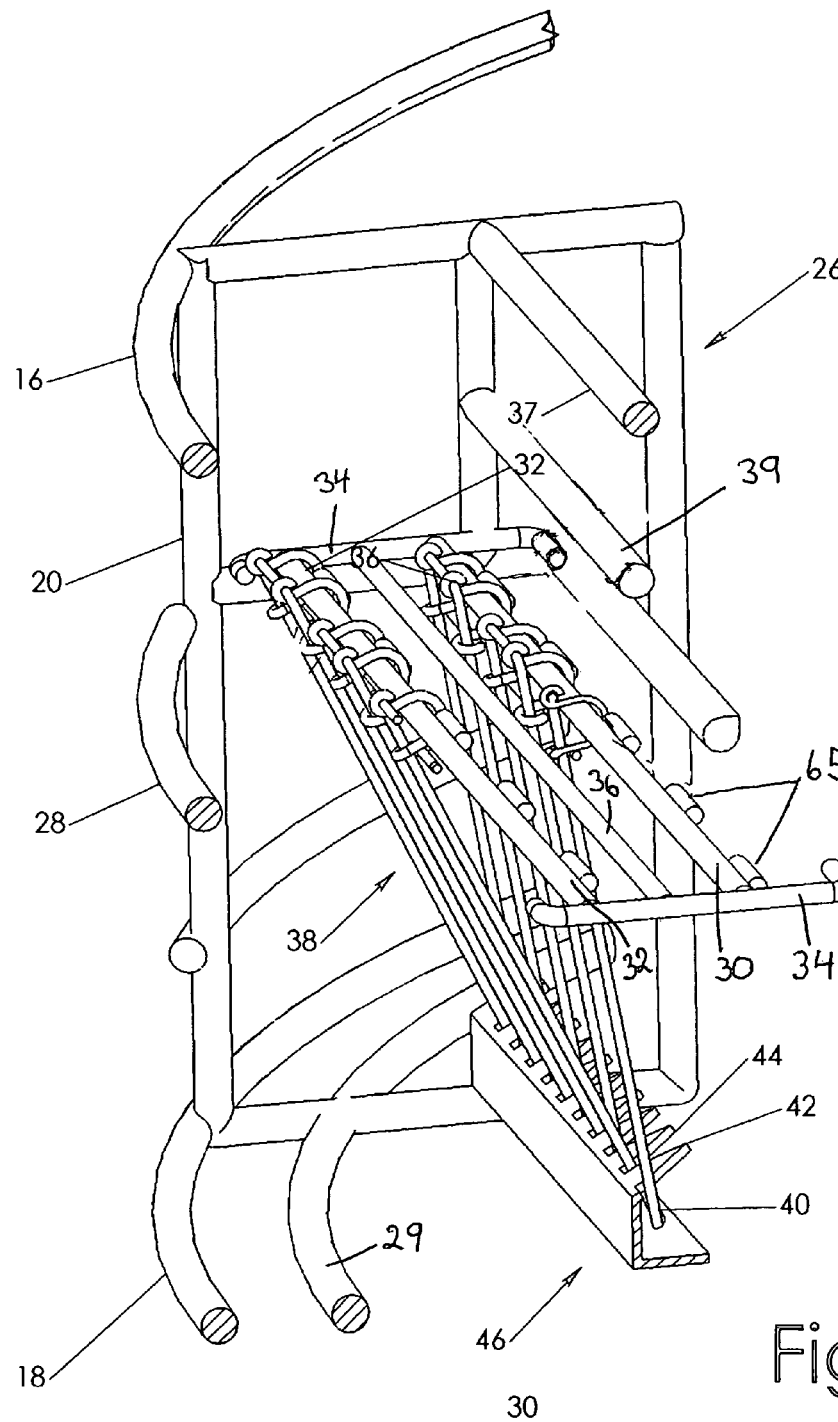
FIG. 4 show a view from one side and above of the parts shown in FIG. 3.

As shown in FIG. 4, each one way inlet gate 24 has a parallel pair of horizontal pivot rods 30 and 32, which are joined at opposite ends to a parallel pair of horizontal support bars 34. The horizontal support bars 34 are each joined to a respective vertical bar 35 extending downwardly from the top of the respective rectangular frame 26, and the bars 34 are also connected together by a horizontal bar 36 extending between and parallel to the pivot rods 30 and 32.

The tops of the recatangular frames 26 are connected by a horizontal bar 37 and the horizontal bars 35 are connected by a horizontal bar 39, the bars 37 and 39 being parallel to the bar 36.

The pivot rods 30 and 32 each pivotably support a set of pins, which are indicated generally by reference numeral 38, and which have lower ends 40 which slidably engage in convergent slots 42 in a pin retainer 44 in the form of a rake-like flange of a channel-shaped pin retainer structure, indicated generally by reference numeral 46, which is made of sheet metal, when the one-way inlet gates 24 are in their closed positions, in which they are shown on FIGS. 1 to 4. The two sets of pins 38 are pivotable, independently of one another, about their respective pivot rods 30 and 32.

The crab trap frame 12 includes circularly curved frame members 48 (FIG. 2), which are located above the bottom peripheral frame portion 18 and are secured at opposite ends of the further frame members 48 to the vertical frame members 20. The further frame members 48 are spaced upwardly from the bottom peripheral frame portion 18 to form therebetween undersize crab outlet openings, indicated generally by reference numerals 51 (FIG. 1), over which the mesh 14 does not extend. These undersize crab outlet openings 51 serve to allow undersized crabs which have entered into the interior of the crab trap 10 to escape from the crab trap 10.

The sets of pins 38 each comprise pairs of the pins 38, formed by parallel legs 50 (FIG. 5) of a U-shaped length of wire.

Figure 3:
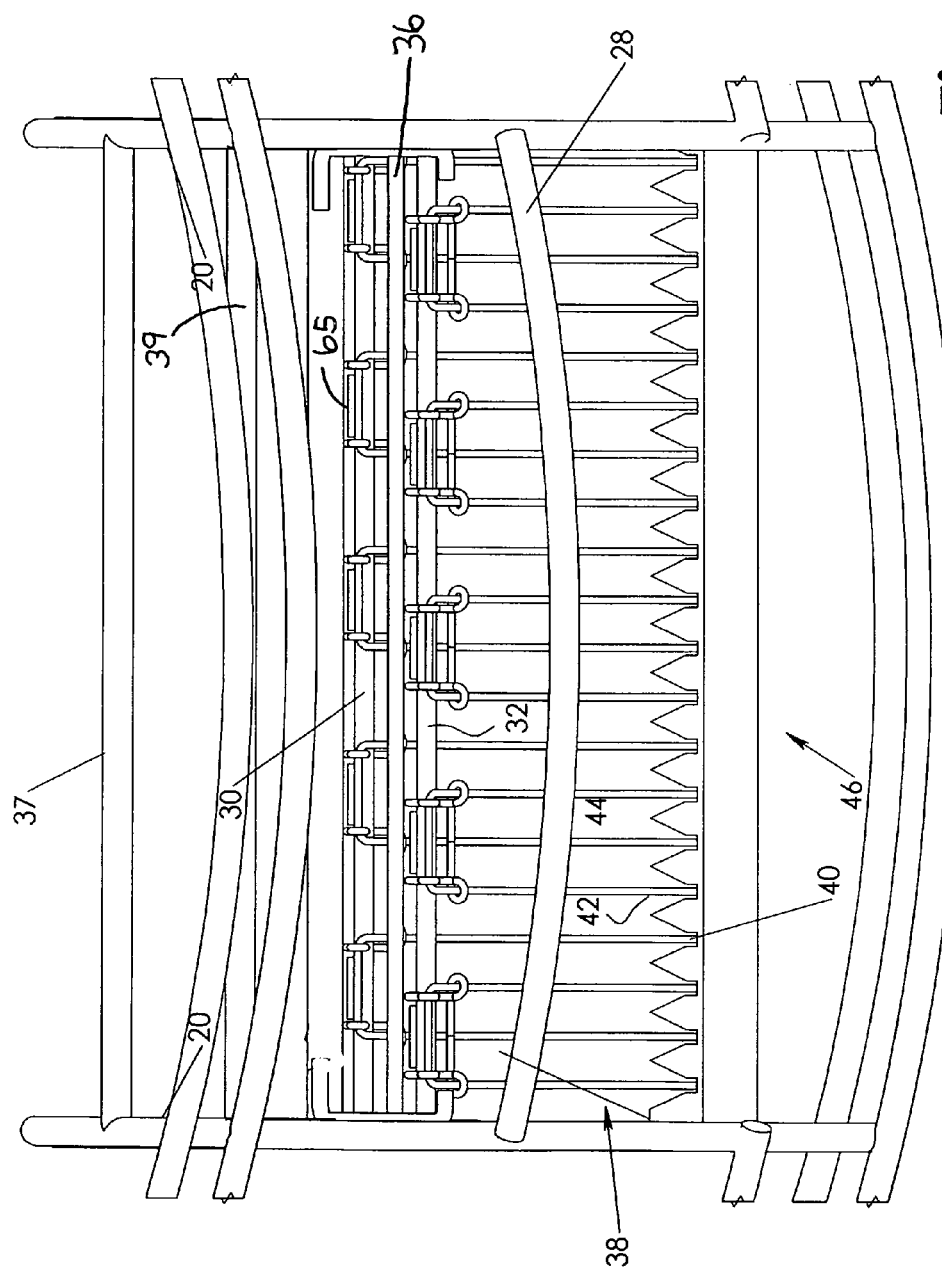
FIG. 3 show a broken-away view, from the front and above, of parts of the crab trap of FIG. 1 with the mesh removed.

Each of the legs 50 has an upper end portion 56, and the upper end portions 56 are connected by an intermediate portion 58 extending between the legs 50. When the one-way inlet gates 24 are in their closed positions, as shown in FIGS. 2-4, the lower ends 40 of the pins 38 are slidably engaged in the slots 42 of the pin retainer 44, as mentioned above, which prevents the lower ends 40 of the pins 38 from being spread apart by the crabs trapped in the interior of the crab trap 10 and trying to escape through the crab inlet openings 22.

Figure 5:
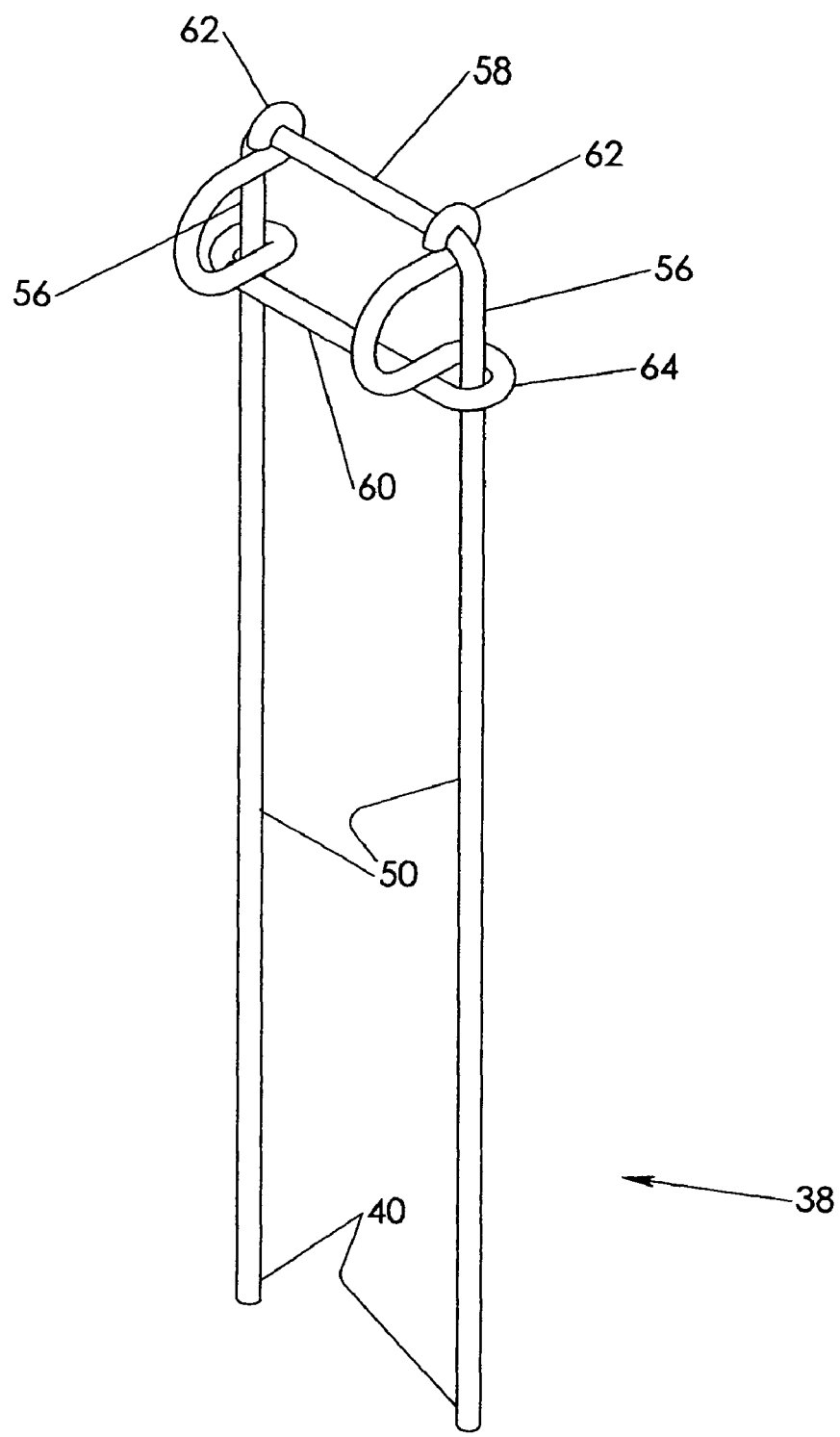
FIG. 5 shows a view in perspective of a pair of pins forming part of the crab trap of FIG. 1.

The U-shaped wire length, as also shown in FIG. 5, is provided with a pin retainer in the form of a pin retainer wire 60. This pin retainer wire 60 has opposite end portions 62 which are bent to form loops around the intermediate portion 58 of the U-shaped wire length so as to retain the pin retainer wire 60 relative to the intermediate portion 58. Also, between its opposite end portions 62, the pin retainer wire 60 has further portions 64 which are bent to form loops around the legs 50 so as to counteract spreading of the top portions of the legs 50 by the crabs.

Lengths of rod 65 are welded as retainers to the pivot rods 30 and 32 and located between the pairs of pins 38 to prevent the latter from sliding along the rods 30 and 32.

As is apparent from FIG. 1, the mesh 14 comprises a circular top portion 66, which is spaced radially inwardly from the top peripheral frame portion 16, and generally cylindrically curved side portions 68 extending between, but not over, the crab inlet openings 22 and secured to the further frame members 48. The circular top portion 66 and the side portions of the mesh 14, and a circular bottom portion of the mesh 14 and the bottom peripheral frame portion 18, are connected together by lengths of twine 74 which span the gaps 70, 71, and 72 and extend around the top and bottom peripheral frame portions 16 and 18.

To enable trapped crabs to be removed from the trap 10, the trap frame 12 includes pairs of semi-circularly curved bars 76 each having opposite ends pivotally retained in a respective pair of cylindrical sleeves 78, which are welded to the top peripheral frame portion 16. By pivotation relative to the sleeves 78, the bars 76, and portions of the mesh 14 secured to the bar 76, can be pivoted upwardly from the top peripheral frame portion 16 to form a pair of openings in the top of the trap 10 through which the trapped crabs can be removed from the trap 10.

When the trap 10 is in use for trapping the crabs, the bars 76 are secured in position relative to the top peripheral frame portion 16 by latches each in the form of a length of wire 80 (FIG. 1), of which only one is shown in the drawings and which at one end is bent around the frame portion 16 and extends over the bar 76, with an opposite end of the wire bent to engage beneath one of the horizontal bars 37.

As will be apparent to those skilled in the art, various modifications may be made in the above-described embodiment of the present invention within the scope of the appended claims. For example, while the trap shown in the accomanying drawings and described above is a crab trap, this trap may alternatively be modified as a lobster trap.

I claim:
1. A trap for crabs or lobsters, comprising:
a trap frame;
a mesh extending over the trap frame;
at least one inlet opening having a one-way inlet gate with a top and a bottom, the one-way inlet gate also having a pair of rectangular frame portions within it and having a top and a bottom, the rectangular frame portions having a pair of vertical frame members with at least two horizontal support bars joining each vertical frame member to the other of the at least two rectangular frame portions;
an at least one horizontal connecting bar connecting the pair rectangular frame portions between the respective at least two horizontal frame support bars;
an at least two pivot rods, the at least one horizontal connecting bar being parallel to and co-located with the at least two pivot rods, the at least one horizontal connecting bar and at least two pivot rods being connected between the at least two horizontal connecting support bars connecting each of the two vertical frame portions, the at least two pivot rods and the at least one horizontal connecting bar each forming the top of one-way inlet gate as part of the at least one inlet opening and each pivot member pivotably supporting an at least one set of pins above the at least one inlet gate, the at least one set of pins further forming the at least one-way inlet gate and extending from the top to the bottom of the one-way gate; and
pin retainers at the bottom of the inlet gate collecting and preventing spreading of the pins apart from one another when the pins are in the closed position, wherein the at least one inlet opening is horizontally elongate and the at least two sets of pins independently rotate about the at least two pivot rods.
2. A trap as claimed in claim 1, wherein the pin retainers comprise multiple teeth of a rake-like structure at the bottom of the inlet opening, the rake like structure forming convergent slots which capture a lower portion of each pin.

3. A trap as claimed in claim 1, wherein the at least one horizontal connecting bar comprises a first horizontal connecting bar disposed between and parallel with the at least two pivot rods connecting the frames and a second horizontal connecting bar parallel to the pivot members and disposed therefrom connecting tops of the pair of rectangular frame portions.

* * * * *